(12) United States Patent
Nishimura

(10) Patent No.: US 9,442,655 B2
(45) Date of Patent: Sep. 13, 2016

(54) CHARACTER INPUT DEVICE, AND METHOD AND PROGRAM FOR INPUTTING CHARACTER

(71) Applicant: KYOCERA Corporation, Kyoto (JP)

(72) Inventor: Osamu Nishimura, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/474,031

(22) Filed: Aug. 29, 2014

(65) Prior Publication Data

US 2014/0368439 A1 Dec. 18, 2014

Related U.S. Application Data

(63) Continuation of application No. 12/680,309, filed as application No. PCT/JP2008/067162 on Sep. 24, 2008, now abandoned.

(30) Foreign Application Priority Data

Sep. 28, 2007 (JP) ................................. 2007-255290

(51) Int. Cl.
*G06F 3/0488* (2013.01)
*G06F 3/023* (2006.01)

(52) U.S. Cl.
CPC ......... *G06F 3/04886* (2013.01); *G06F 3/0234* (2013.01)

(58) Field of Classification Search
CPC .. G06F 3/0233; G06F 3/0234; G06F 3/0236; G06F 3/04886; G06F 3/04897; B60K 2350/1004; B60K 2350/1024; B60K 3/1028; B60K 3/1032

See application file for complete search history.

(56) References Cited

U.S. PATENT DOCUMENTS

| | | | |
|---|---|---|---|
| 6,271,835 | B1 | 8/2001 | Hoeksma |
| 6,980,200 | B2 | 12/2005 | Goren |
| 7,136,047 | B2 | 11/2006 | Shimada et al. |

(Continued)

FOREIGN PATENT DOCUMENTS

| | | |
|---|---|---|
| JP | 2000-056912 | 2/2000 |
| JP | 2000-112636 A | 4/2000 |

(Continued)

OTHER PUBLICATIONS

Notice of Ground of Rejection issued in a divisional application No. 2011-164029 of the corresponding Japanese application, dated Jun. 25, 2013.

(Continued)

*Primary Examiner* — Keith Crawley
(74) *Attorney, Agent, or Firm* — Procopio Cory Hargreaves and Savitch LLP

(57) ABSTRACT

In order to facilitate selection of an intended character from among a plurality of characters. a mobile phone includes a designated-position detecting portion (S01) for detecting a designated position. a moving direction detecting portion (S07) for detecting a moving direction of the detected position. a group selecting portion (S08), when the moving direction is detected, for selecting one of a plurality of character types into which the plurality of characters have been classified, on the basis of the moving direction, and a character selecting portion (S10, S15) for selecting one of at least one character classified in the selected character type.

4 Claims, 9 Drawing Sheets

(56) References Cited

U.S. PATENT DOCUMENTS

| | | | |
|---|---|---|---|
| 7,554,529 | B2 | 6/2009 | Kotipalli |
| 8,405,601 | B1 | 3/2013 | Beale |
| 2002/0027549 | A1* | 3/2002 | Hirshberg ............... 345/168 |
| 2002/0145587 | A1 | 10/2002 | Watanabe |
| 2005/0089226 | A1 | 4/2005 | Chang et al. |
| 2006/0007162 | A1 | 1/2006 | Kato |
| 2006/0095844 | A1* | 5/2006 | Van Leeuwen ............ 715/700 |
| 2007/0139382 | A1* | 6/2007 | Kotipalli ............... 345/168 |
| 2007/0152978 | A1 | 7/2007 | Kocienda et al. |
| 2007/0216659 | A1* | 9/2007 | Amineh ................. 345/173 |

FOREIGN PATENT DOCUMENTS

| | | |
|---|---|---|
| JP | 2001-265498 | 9/2001 |
| JP | 2002-03-29 A | 3/2002 |
| JP | 2002-108543 A | 4/2002 |
| JP | 2004-280531 A | 10/2004 |
| JP | 2004-355336 A | 12/2004 |
| JP | 2005-032189 A | 2/2005 |
| JP | 2005-128802 A | 5/2005 |
| JP | 2005-182487 | 7/2005 |
| JP | 2007-128802 A | 5/2007 |
| JP | 2007-193465 | 8/2007 |
| JP | 2007-193465 A | 8/2007 |

OTHER PUBLICATIONS

Notice of Ground of Rejection issued in a divisional application No. 2012-281520 of the corresponding Japanese application, dated Aug. 6, 2013.

Notice of Ground Rejection issued in a divisional application No. 2012-281520 of the corresponding Japanese application, dated Aug. 6, 2013.

Notice of Ground Rejection dated Sep. 4, 2012, issued in counterpart Japanese Application No. 2011-164029.

Decision of Rejection and Decision to Decline Amendment dated Sep. 25, 2012, issued in counterpart Japanese Application No. 2007/255290.

Notice of Grounds of Rejection dated Mar. 21, 2012, issued in counterpart Japanese Application No. 2007-255290.

Notice of Decision to Grant a Patent dated Mar. 28, 2012, issued in counterpart Korean Patent No. 2010-7009258.

Notice of Argument Submission dated Dec. 26, 2011, issued in counterpart Korean Application No. 2011-7022924.

Notice of Allowance dated Aug. 23, 2012, issued in counterpart Korean application No. 2011-7022924.

Office Action dated Jun. 2, 2015 issued in counterpart Japanese Application 2014-090525.

* cited by examiner

FIG. 4

| KEY | GROUP NAME | CHARACTER TYPE | | | | |
|---|---|---|---|---|---|---|
| | | HIRAGANA | KATAKANA | UPPERCASE ALPHANUMERIC | LOWERCASE ALPHANUMERIC | NUMBER |
| 1 | G1 | あいうえお<br>ぉぇぅぃぁ | アイウエオ<br>ォェゥィァ | .@-<br>1～／ | .@-<br>1～／ | 1 |
| 2 | G2 | かきくけこ | カキクケコ | ABC2 | abc2 | 2 |
| 3 | G3 | さしすせそ | サシスセソ | DEF3 | def3 | 3 |
| 4 | G4 | たちつてと<br>っ | タチツテト<br>ッ | GHI4 | ghi4 | 4 |
| 5 | G5 | なにぬねの | ナニヌネノ | JKL5 | jkl5 | 5 |
| 6 | G6 | はひふへほ | ハヒフヘホ | MNO6 | mno6 | 6 |
| 7 | G7 | まみむめも | マミムメモ | PQRS7 | pqrs7 | 7 |
| 8 | G8 | やゆよやゅょ | ヤユヨャュョ | TUV8 | tuv8 | 8 |
| 9 | G9 | らりるれろ | ラリルレロ | WXYZ9 | wxyz9 | 9 |
| 0 | G10 | わをんゎ、。ー<br>？！～ | ワヲンヮ、。ー<br>？！～ | 0 | 0 | 0 |

CHARACTER INPUT DEVICE, AND METHOD AND PROGRAM FOR INPUTTING CHARACTER

CROSS-REFERENCE TO RELATED APPLICATIONS

The present application is a continuation of U.S. application Ser. No. 12/680,309 which is the US National Stage application of PCT Application No. PCT/JP2008/067162 filed on Sep. 24, 2008, which claims priority under 35 U.S.C. §119 to Japanese Patent Application No. 2007-255290, filed on Sep. 28, 2007. The content of each of these applications are incorporated herein by reference in their entirety.

TECHNICAL FIELD

The present invention relates to a character input device, and a method and a program embodied on a computer readable storage medium for inputting a character. More specifically, the present invention relates to a character input device included in a portable device, and a method and a program embodied on a computer readable storage medium for inputting a character which are carried out in the character input device.

BACKGROUND ART

Recently, there is a demand for providing a compact information device such as a mobile phone with a function of inputting characters in order to generate email and the like. In the mobile phone, it is preferable to reduce the number of buttons provided therein.

As a conventional art, a character input device is known in which a plurality of character list display means for each displaying a plurality of pieces of character information consisting of characters of a specific character type are displayed on display means, and when an arbitrary character in the character list display means is designated by designating means, character type displaying means for displaying a character of at least one character type corresponding to the designated character is displayed. When a character of an arbitrary character type within the character type display means is designated by the designating means and when the designating means is released therefrom, the character information corresponding to the character type of the character that was being displayed at the position from which the designating means had been released is displayed on the character list display means.

With the conventional character input device, however, the character list needs to be displayed, which occupies a large display area. This poses a problem that the display area is restricted due to input of a character.

DISCLOSURE OF THE INVENTION

Problems to be Solved by the Invention

The present invention has been accomplished to solve the above-described problems, and an object of the present invention is to provide a character input device which is capable of readily selecting a character from among a plurality of characters.

Another object of the present invention is to provide a character input device which is capable of detecting a variety of inputs without enlarging an area into which a character is input.

A further object of the present invention is to provide a method for inputting a character which allows a character to be readily selected from among a plurality of characters.

A still further object of the present invention is to provide a program embodied on a computer readable storage medium for inputting a character which allows a character to be readily selected from among a plurality of characters.

Means for Solving the Problems

To achieve the above-described objects, according to an aspect of the present invention, a character input device includes: position detecting portion to detect a designated position; direction detecting portion to detect a moving direction of the position detected by the position detecting portion; first selecting portion, when the moving direction is detected by the direction detecting portion, for selecting one group as a selecting group, from among a plurality of groups into which a plurality of characters have been classified, on the basis of the moving direction; and second selecting portion to select one of at least one character classified in the selecting group selected.

According to another aspect of the present invention, a character input device includes: position detecting portion to detect a designated position; direction detecting portion to detect a moving direction of the position detected by the position detecting portion; first selecting portion to select, on the basis of the position detected at a predetermined time by the position detecting portion, one group as a first selecting group from among a plurality of first type groups into which a plurality of characters have been classified; second selecting portion, when the moving direction is detected by the direction detecting portion, for selecting one group as a second selecting group, from among a plurality of second type groups into which the plurality of characters have been classified, on the basis of the moving direction; and third selecting portion to select one of at least one character, among the plurality of characters, that has been classified in both the first selecting group and the second selecting group.

According to yet another aspect of the present invention, a character input device includes: position detecting portion to detect a designated position; and key input detecting portion having a plurality of keys arranged under a predetermined rule and for detecting that each one of the plurality of keys has been designated; wherein the position detecting portion includes a plurality of areas which correspond respectively to the plurality of keys included in the key input detecting portion.

According to yet another aspect of the present invention, a character input device includes: position detecting portion to detect a designated position; character selecting portion to select a character which is associated in advance with a first position detected by the position detecting portion; displaying portion to display a related character which is classified in a same group as the selected character, at a second position around the first position; direction detecting portion to detect a moving direction of the position detected by the position detecting portion; and related character selecting portion to make selectable the related character that is being displayed at the second position in the case where the direction detecting portion detects a moving direction from the first position toward the second position.

According to a further aspect of the present invention, a method for inputting a character includes the steps of: detecting a designated position; detecting a moving direction of the detected position; when the moving direction is detected, selecting one group as a selecting group, from among a plurality of groups into which a plurality of characters have been classified, on the basis of the moving direction; and selecting one of at least one character classified in the selecting group selected.

According to a still further aspect of the present invention, an inputting character program embodied on a computer readable storage medium causes a computer to perform the steps of: detecting a designated position; detecting a moving direction of the detected position; when the moving direction is detected, selecting one group as a selecting group, from among a plurality of groups into which a plurality of characters have been classified, on the basis of the moving direction; and selecting one of at least one character classified in the selecting group selected.

BRIEF DESCRIPTION OF THE DRAWINGS

FIG. 4 is a diagram showing an example of a character table.

DESCRIPTION OF REFERENCE CHARACTERS

Figure 1A:
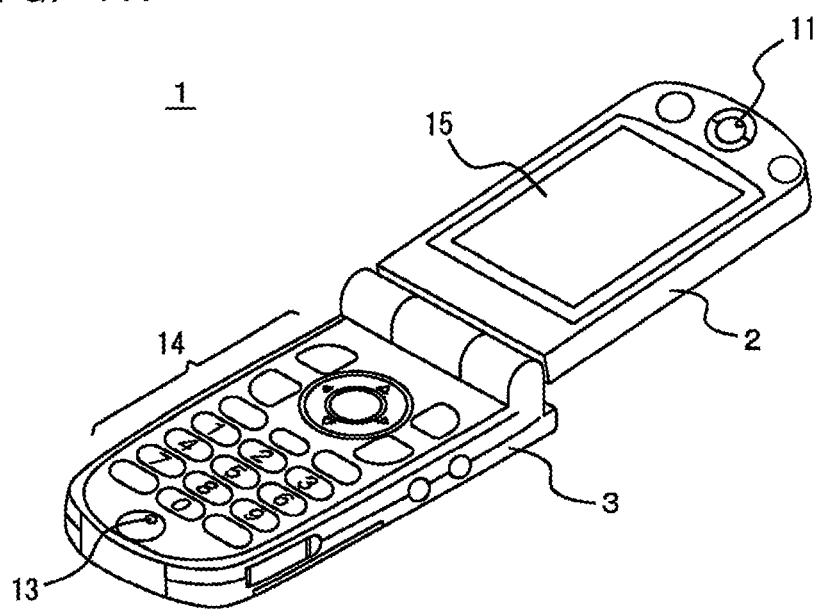
FIG. 1A is a perspective view of a mobile phone in the state of an open style.

1: mobile phone; 2: display side portion; 3: operation side portion; 11: first speaker; 12: second speaker; 13: microphone; 14: operation portion; 21: control portion; 23: communication circuit; 23A: antenna; 25A: key rubber; 25B: dome sheet; 25C: key circuit board; 27: touch sensor; 27A: hole; 29: codec portion; 35: battery; 37: card I1F; 37A: flash memory; 51, 51A: designated-position detecting portion; 53: moving direction detecting portion; 55: moving distance measuring portion; 57: group selecting portion; 59: character type selecting portion; 61: character selecting portion; 63: display control portion; 71: key accepting portion; 81: input character displaying area; 83B: cursor area; and 85: guidance displaying area.

BEST MODES FOR CARRYING OUT THE INVENTION

Embodiments of the present invention will now be described with reference to the drawings. In the following description, like reference characters denote like parts, which have like names and functions, and therefore, detailed description thereof will not be repeated.

While a mobile phone will be described as an example of a character input device in the following description, the character input device is not limited to the mobile phone, but may be any device such as personal digital assistants (PDA), as long as the device is used for input of a character.

Figure 1B:
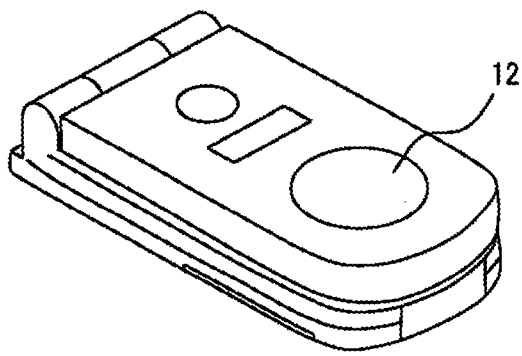
FIG. 1B is a perspective view of the mobile phone in the state of a closed style.

FIG. 1A and FIG. 1B are perspective views of a mobile phone according to an embodiment of the present invention. FIG. 1A shows the mobile phone in the state of an open style, while FIG. 1B shows the mobile phone in the state of a closed style. Referring to FIGS. 1A and 1B, a mobile phone 1 includes an operation side portion 3 and a display side portion 2.

Operation side portion 3 has an operation portion 14 accepting an operation input by a user and a microphone 13, which are arranged on its inner surface. Display side portion 2 has a liquid crystal display (LCD) 15 and a first speaker 11 constituting a receiver, which are arranged on its inner surface, and a second speaker 12 arranged on its outer surface.

Although mobile phone 1 has LCD 15 in this example, LCD 15 may be replaced with an organic electro-luminescence (EL) display.

Operation side portion 3 and display side portion 2 are rotatably connected via a hinge mechanism to be freely opened and closed. The state where mobile phone 1 is folded and operation side portion 3 and display side portion 2 are in the closed position corresponds to the closed style, while the state where mobile phone 1 is open and operation side portion 3 and display side portion 2 are in the open position corresponds to the open style.

Figure 2:
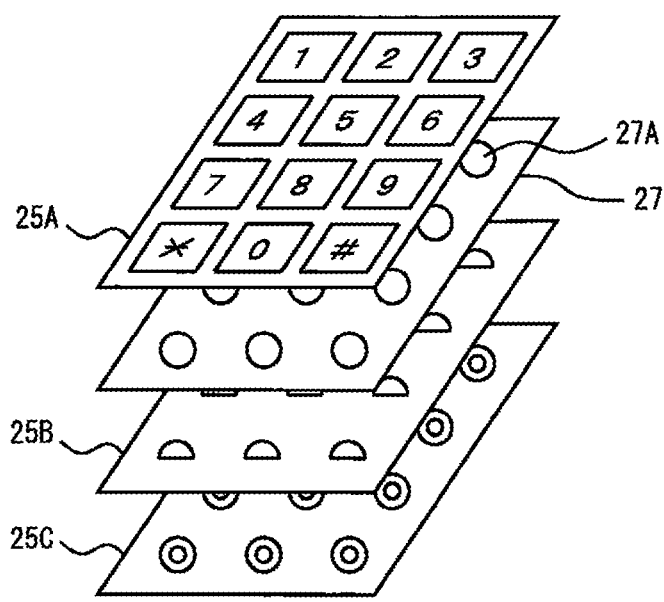
FIG. 2 is a diagram showing a configuration of an operation portion in the mobile phone.

FIG. 2 is a diagram showing a configuration of an operation portion in the mobile phone. Referring to FIG. 2, operation portion 14 is made up of: a key rubber 25A having 12 keys arranged thereon under a predetermined rule; a touch sensor 27; a dome sheet 25B having 12 dome keys arranged thereon in correspondence respectively with the 12 keys; and a key circuit board 25C having 12 switch patterns arranged thereon in correspondence respectively with the 12 keys, which are stacked on one another in this order.

When one of the 12 keys arranged on key rubber 25A is pressed down, one of the 12 dome keys on dome sheet 25B that is located at a position corresponding to the pressed key is depressed, causing one of the 12 switch patterns on key circuit board 25C that is located at a position corresponding to the pressed key to be shorted. Which key among the 12 keys arranged on key rubber 25A has been pressed down can be detected by detecting which switch pattern among the 12 switch patterns arranged on key circuit board 25C has been shorted.

Touch sensor 27, which is arranged under key rubber 25A, has at least a size covering all the 12 keys included in key rubber 25A, and has 12 holes 27A at positions corresponding respectively to the 12 keys arranged on key rubber 25A. When one of the 12 keys arranged on key rubber 25A is pressed down, the pressed part of key rubber 25A directly presses down the corresponding dome key in dome sheet 25B. This ensures that a key pressing event can be detected even in the case where the key is pressed down with a small force. When any of the 12 keys arranged on key rubber 25A is pressed down, no physical force is applied to touch sensor 27, which prevents a break from occurring in touch sensor 27.

Figure 3:
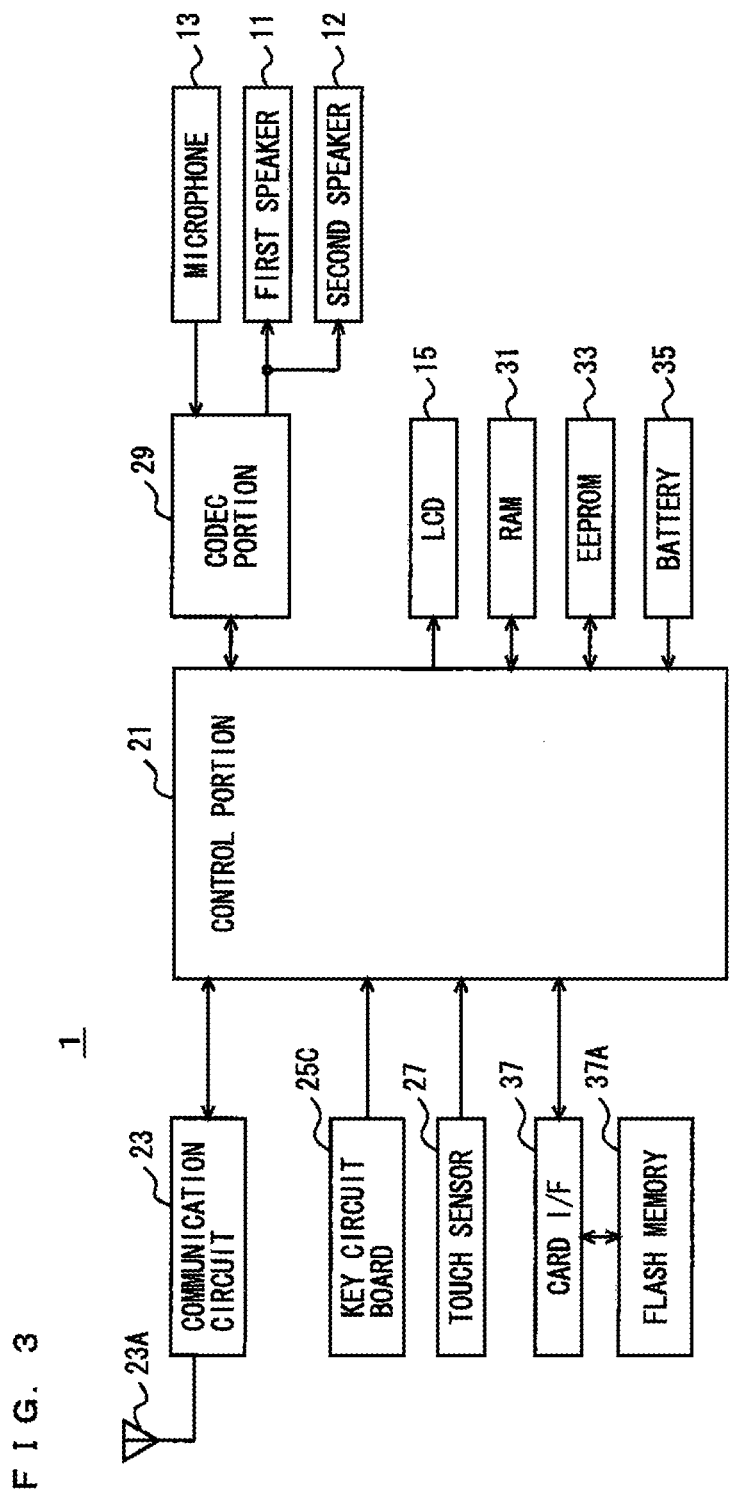
FIG. 3 is a functional block diagram showing, by way of example, the functions of the mobile phone according to the present embodiment.

FIG. 3 is a functional block diagram showing, by way of example, the functions of the mobile phone of the present embodiment. Referring to FIG. 3, mobile phone 1 includes a control portion 21 responsible for overall control of mobile phone 1, and also includes a communication circuit 23, a codec portion 29 for processing audio data, a key circuit board 25C, a touch sensor 27, a card interface (I/F) 37, a liquid crystal display (LCD) 15, a random access memory (RAM) 31 used as a work area for control portion 21, an electronically erasable and programmable ROM (EEPROM) 33 for storing in a nonvolatile manner a program or data to be executed by control portion 21, and a battery 35 for supplying power into the whole of mobile phone 1, which are each connected to control portion 21.

When one of the 12 keys arranged on key rubber 25A is pressed down, key circuit board 25C detects the key pressing event, and outputs to control portion 21 a signal indicating the key that has been pressed down.

Touch sensor 27 is a capacitive touch panel. Touch sensor 27 detects a change in static electricity. When a user touches key rubber 25A with his or her finger, touch sensor 27 detects the touched position as a designated position. Touch sensor 27 has 12 holes 27A. When a user designates one of holes 27A with his or her finger, touch sensor 27 accurately detects that hole 27A has been designated, by detecting a change in static electricity around that hole 27A.

While a user is touching key rubber 25A with his or her finger, touch sensor 27 outputs to control portion 21 the designated position being detected. When a user is designating the same position, touch sensor 27 continues to output the same designated position to control portion 21. Touch sensor 27 may be configured to output the designated position to control portion 21 at predetermined time intervals while a user is touching key rubber 25A with his or her finger. In this case as well, control portion 21 is capable of detecting that the user continues to touch key rubber 25A with his or her finger.

Communication circuit 23 connects mobile phone 1 to a network. It is here assumed that a wideband code division multiple access (W-CDMA) is used as a communication method in the network. Communication circuit 23 performs radio communication with a base station apparatus connected to the W-CDMA network. A radio signal transmitted from the base station apparatus is received by an antenna 23A. Communication circuit 23 receives a radio signal received by antenna 23A, and outputs to control portion 21 a signal acquired by demodulating the radio signal. When the signal acquired by demodulating the radio signal is an audio signal, control portion 21 outputs the audio signal to codec portion 29. The communication method may be one of other communication methods.

When receiving a signal from control portion 21, communication circuit 23 outputs a radio signal acquired by modulating the signal to antenna 23A. When receiving an audio signal from codec portion 29, control portion 21 outputs the audio signal to communication circuit 23. The radio signal transmitted from antenna 23A is received by and input into the W-CDMA base station apparatus.

Codec portion 29 is connected to microphone 13, first speaker 11, and second speaker 12. Codec portion 29 decodes an audio signal input from control portion 21, converts the decoded digital audio signal to an analog signal, and amplifies the signal to output it to speaker 11 or second speaker 12. Further, codec portion 29 receives an analog audio signal from microphone 13, converts the audio signal to a digital signal, encodes it, and outputs the encoded audio signal to control portion 21.

A removable flash memory 37A is mounted to card I/F 37. Control portion 21 is capable of accessing flash memory 37A via card I/F 37. While it is here assumed that the program to be executed by control portion 21 is stored in EEPROM 33 in advance, the program may be stored in flash memory 37A and read therefrom to be executed by control portion 21. The recording medium for storing the program is not restricted to flash memory 37A. It may be a flexible disk, a cassette tape, an optical disk (compact disc-ROM (CD-ROM), magnetic optical disc (MO), mini disc (MD), digital versatile disc (DVD)), an IC card, an optical card, or a semiconductor memory such as a mask ROM, an erasable programmable ROM (EPROM), an electronically erasable programmable ROM (EEPROM), or the like.

Still alternatively, mobile phone 1 may be connected to the Internet via communication circuit 23 and the program may be downloaded from a computer connected to the Internet, to be executed by control portion 21. As used herein, the "program" includes, not only the program directly executable by control portion 21, but also a source program, a compressed program, an encrypted program, and others.

Battery 35, which is a secondary battery such as a lithium polymer battery, a nickel-cadmium battery, or a nickel hydride battery, supplies power to the whole of mobile phone 1.

Mobile phone 1 according to the present embodiment stores a character table in EEPROM 33 in advance, for accepting input of a character. FIG. 4 is a diagram showing an example of a character table. Referring to FIG. 4, the character table includes a "key" field, a "group name" field, and a "character type" field. The "character type" field includes a "hiragana" field, a "katakana" field, an "uppercase alphanumeric" field, a "lowercase alphanumeric" field, and a "number" field. The character table classifies a plurality of characters into a plurality of character types (a plurality of second types of groups).

The character table classifies the plurality of characters into ten groups (a plurality of first types of groups). The character table shown in FIG. 4 includes ten groups having group names of "G1" to "G10", respectively. Furthermore, the character table associates the ten groups respectively with the ten keys included in operation portion 14. Here, group "G1" is associated with the number"1" key, group "G2" is associated with the number "2" key, . . . , group "G9" is associated with the number "9" key, and group "G10" is associated with the number "0" key.

Hiragana characters are classified under the "hiragana" field, katakana characters are classified under the "katakana" field, uppercase alphanumeric characters are classified under the "uppercase alphanumeric" field, lowercase alphanumeric characters are classified under the "lowercase alphanumeric" field, and numbers are classified under the "number" field.

For example, group name "G2" is associated with the number "2" key, and the following are classified in or assigned to group "G2": five hiragana characters belonging to the "か" gyou as the characters of the character type "hiragana", five katakana characters belonging to the "カ" gyou as the characters of the character type "katakana", uppercase alphabetic characters "A", "B", and "e" and number "2" as the characters of the character type "uppercase alphanumeric", lowercase alphabetic characters "a", "b", and "c" and number "2" as the characters of the character type "lowercase alphanumeric", and number "2" as the character of the character type "number".

Figure 5:
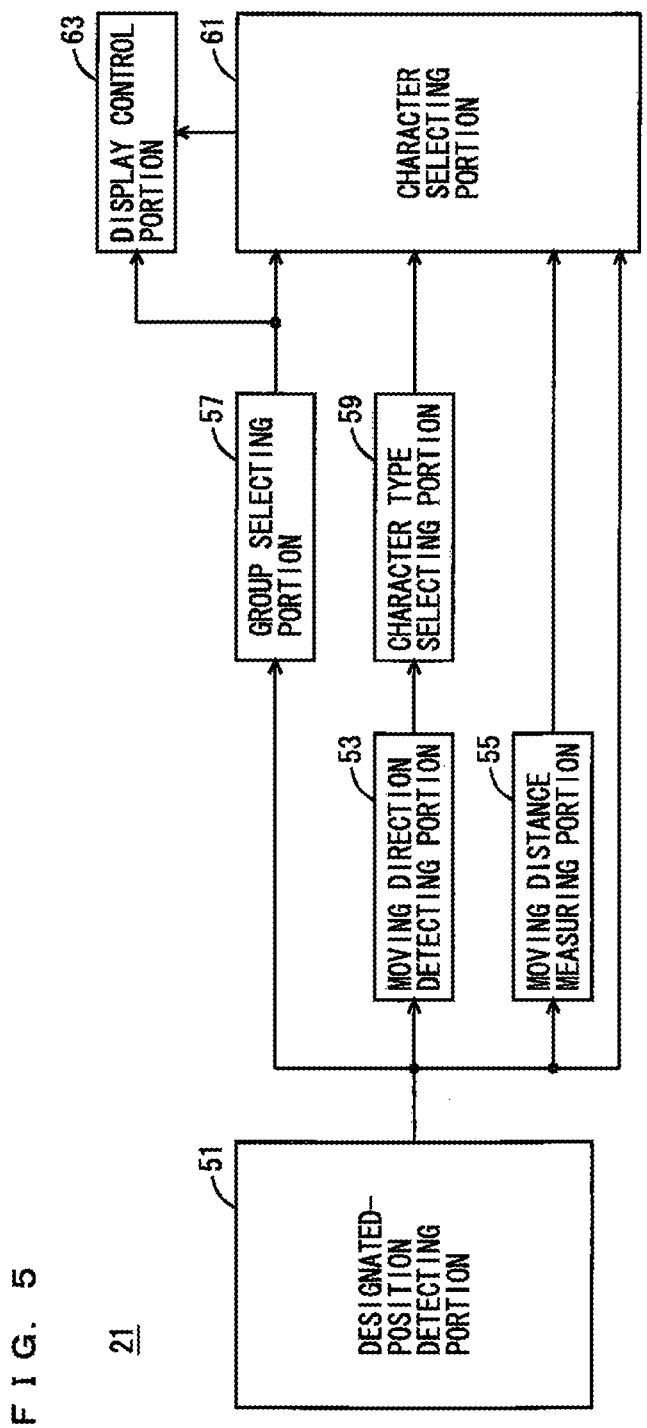
FIG. 5 is a functional block diagram showing, by way of example, the functions of a control portion included in the mobile phone.

FIG. 5 is a functional block diagram showing, by way of example, the functions of the control portion included in the mobile phone. Referring to FIG. 5, control portion 21 includes a designated-position detecting portion 51 for detecting a designated position which is designated by a user, a moving direction detecting portion 53 for detecting a moving direction of the designated position, a moving distance measuring portion 55 for measuring a moving distance of the designated position, a group selecting portion 57 for selecting one often groups defined in a character table on the basis of the designated position, a character type selecting portion 59 for selecting a character type on the basis of the detected moving direction, a character selecting portion 61 for selecting one of a plurality of characters which are included in the group selected and included in the character type selected, and a display control portion 63 for controlling an LCD to display characters.

Designated-position detecting portion 51 detects a designated position output from touch sensor 27. When detecting a designated position, designated-position detecting portion 51 outputs the designated position to group selecting portion 57, moving direction detecting portion 53, moving distance measuring portion 55, and character selecting portion 61. When a designated position which continued to be detected is no longer detected, designated-position detecting portion 51 outputs a determination signal to character selecting portion 61, and outputs a reset signal to group selecting portion 57, moving direction detecting portion 53, and moving distance measuring portion 55. For example, during the period in which a designated position is detected repeatedly at predetermined time intervals, designated-position detecting portion 51 determines that the designated position continues to be detected. On the other hand, when a designated position is not detected the predetermined time after the designated position was detected, designated-position detecting portion 51 determines that the designated position dose not continue to be detected.

When receiving a first designated position from designated-position detecting portion 51, group selecting portion 57 selects one of the ten groups included in the character table, on the basis of the first designated position, and outputs the group name of the selected group to character selecting portion 61. The first designated position received from designated-position detecting portion 51 refers to a designated position that is received directly after a reset signal is received from designated-position detecting portion 51, or a designated position that is received directly after mobile phone 1 enters a character input mode. Any designated position that is received following the first designated position prior to input of a reset signal is not a first designated position. Therefore, group selecting portion 57 does not select a group on the basis of that designated position. When receiving a reset signal from designated-position detecting portion 51, group selecting portion 57 cancels the group which has been selected till then, and outputs a cancel signal to character selecting portion 61.

Specifically, a key position table is stored in EEPROM 33 in advance, in which each of the 12 keys arranged on key rubber 25A is associated with its position on touch sensor 27. Group selecting portion 57 refers to the key position table to select one of the 12 keys that is associated with the position nearest to the first designated position received from designated-position detecting portion 51. Group selecting portion 57 then refers to the character table, stored in EEPROM 33, to select a group associated with the selected key from among the ten groups included in the character table, and outputs the group name of the selected group to character selecting portion 61 and display control portion 63. It is noted that, when a "*" key or a "#" key is designated, group selecting portion 57 selects no group and outputs nothing to character selecting portion 61. Alternatively, a specific character may be assigned to the "*" key or the "#" key, or a character that cannot be classified may be assigned thereto.

When a first designated position is input from designated-position detecting portion 51, moving direction detecting portion 53 waits until a designated position that is different from the first designated position is input next from designated-position detecting portion 51. Here, the designated position that is input following the first designated position and is different from the first designated position is referred to as a "designated position for direction detection". Moving direction detecting portion 53 detects, as a moving direction, the direction from the first designated position toward the designated position for direction detection, and outputs the detected moving direction to character type selecting portion 59. It is here assumed that one of four directions of up, down, left, and right is detected, the number of the directions being the same as the number of character types, or four. If it is configured to detect eight directions including diagonal directions, a selection can be made from among eight character types. When receiving a reset signal from designated-position detecting portion 51, moving direction detecting portion 53 outputs a cancel signal to character types electing portion 59.

As the designated position for direction detection, a designated position of which distance from the first designated position is greater than a predetermined length is preferably used. The predetermined length may be about 2 mm, for example. Using a designated position a predetermined distance away from the first designated position as the designated position for direction detection enables accurate detection of the direction designated by a user.

Character type selecting portion 59 selects one of the four character types included in the character table on the basis of the moving direction received from moving direction detecting portion 53. Character type selecting portion 59 outputs the selected character type to character selecting portion 61. When receiving a cancel signal from moving direction detecting portion 53, character type selecting portion 59 outputs nothing to character selecting portion 61.

Specifically, the character table includes, as the four character types, "hiragana", "uppercase alphanumeric", "lowercase alphanumeric", and "katakana". Character type selecting portion 59 associates a character type with each of the four directions in advance, and selects a character type corresponding to the moving direction received from moving direction detecting portion 53. Here, when the upward direction is input as the moving direction, the character type "uppercase alphanumeric" is selected. When the downward direction is input as the moving direction, the character type "hiragana" is selected. When the leftward direction is input as the moving direction, the character type "katakana" is selected. When the rightward direction is input as the moving direction, the character type "lowercase alphanumeric" is selected.

Moving distance measuring portion 55 uses the first designated position received from designated-position detecting portion 51 as a reference position. For every input of a designated position from designated-position detecting portion 51, moving distance measuring portion 55 calculates a moving distance from the first designated position to the designated position which was input, and outputs the calculated moving distance to character selecting portion 61. Here, the designated position corresponding to an endpoint that is used for calculating a moving distance is referred to as a "designated position for distance calculation". The moving distance is a distance between the first designated position and the designated position for distance calculation. A cumulative total of the moving distances calculated may be obtained whenever a moving distance is calculated. When the position designated by a user moves in a curve, a distance approximating the curve can be calculated as the moving distance. When receiving a reset signal from designated-position detecting portion 51, moving distance measuring portion 55 resets the moving distance to "0".

Character selecting portion 61 selects a group having the group name received from group selecting portion 57, from among the groups included in the character table stored in EEPROM 33, while the group name is being received from group selecting portion 57, or in other words, from when the group name is received from group selecting portion 57 to when a cancel signal is received therefrom.

Upon receipt of the group name from group selecting portion 57, character selecting portion 61 refers to the character table stored in EEPROM 33, to select a character that has been classified in the group having the group name input and further classified as the character type "number", and outputs the selected character to display control portion 63. For example, when the number "5" key is designated, group name "G5" is received from group selecting portion 57. In this case, the number "5" is selected, and this character is output to display control portion 63.

Thereafter, character selecting portion 61 receives a character type from character type selecting portion 59. Upon receipt of the character type from character type selecting portion 59, character selecting portion 61 refers to the character table stored in EEPROM 33, to select a plurality of characters that have been classified in the group having the previously-input group name and further classified as the character type input. For example, in the case where group name "G5" is input and then "hiragana" is input as a character type, the five characters of "な", "に", "ぬ", "ね", and "の" are selected.

Furthermore, character selecting portion 61 selects one of the selected characters on the basis of the moving distance received from moving distance measuring portion 55, and outputs the selected character to display control portion 63. Character selecting portion 61 specifies the sequence of the selected characters in advance. Character selecting portion 61 then selects a first character in the specified sequence when the moving distance exceeds 2 mm, for example. When the moving distance exceeds e.g. 2 mm, a moving direction is determined, and a character type is determined by character type selecting portion 59. Character selecting portion 61 selects a next character in the specified sequence whenever the moving distance increases by a predetermined distance. When the moving distance increases by the predetermined distance after the last character in the specified sequence has been selected, the first character in the specified sequence is selected. For example, at the point in time when a character type is selected, character selecting portion 61 firstly selects a first character in a predetermined sequence. The character to be selected first can be arbitrarily determined in the predetermined sequence. It is assumed that characters are selected in Japanese alphabetical order, alphabetical order, and ascending order of numbers here. The character to be selected first may be determined on the basis of the history in which characters were selected in the past. Further, it may be configured such that the select sequence is reversed when a predetermined key provided on operation portion 14 is designated. In this case, even if a designated position is moved too far and thus a character succeeding an intended character has been selected, the preceding, originally intended character can he selected. As such, re-selection can be made with ease and in a short time.

When receiving a determination signal from designated-position detecting portion 51, character selecting portion 61 outputs a cursor movement instruction to display control portion 63.

While moving direction detecting portion 53 is configured to detect a moving direction on the basis of the first designated position received from designated-position detecting portion 51 and the designated position for direction detection here, in the event that a moving direction that is detected on the basis of two designated positions input after the moving direction has once been detected is different from the previously-detected moving direction, moving direction detecting portion 53 may output the lastly detected moving direction to character type selecting portion 59. For example, when a user moves a position designated with his or her finger firstly upward and then rightward, moving direction detecting portion 53 outputs the upward moving direction first, and then outputs the rightward moving direction at the point in time when the rightward motion is detected. Accordingly, even when an incorrect character type is selected, the selected character type can be modified immediately.

In the case where moving direction detecting portion 53 outputs to character type selecting portion 59 a lastly detected moving direction in the event that a moving direction detected on the basis of two designated positions input after the moving direction has once been detected is different from the previously-detected moving direction, moving distance measuring portion 55 resets the moving distance whenever moving direction detecting portion 53 detects a new moving direction. In this case, moving distance measuring portion 55 resets the moving distance whenever the moving direction is changed, and measures a distance in a straight line between two designated positions as a moving distance. Moving distance measuring portion 55 measures a moving distance from the firstly detected one of the two designated positions that had caused moving direction detecting portion 53 to detect a new moving direction.

In the case where character selecting portion 61 receives different character types from character type selecting portion 59 after it receives a group name from group selecting portion 57 and before it receives a determination signal from designated-position detecting portion 51, character selecting portion 61 refers to the character table stored in EEPROM 33 whenever a character type is input from character type selecting portion 59, to select a plurality of characters that have been classified in the group having the previously-input group name and further classified as the character type input.

Figure 6:
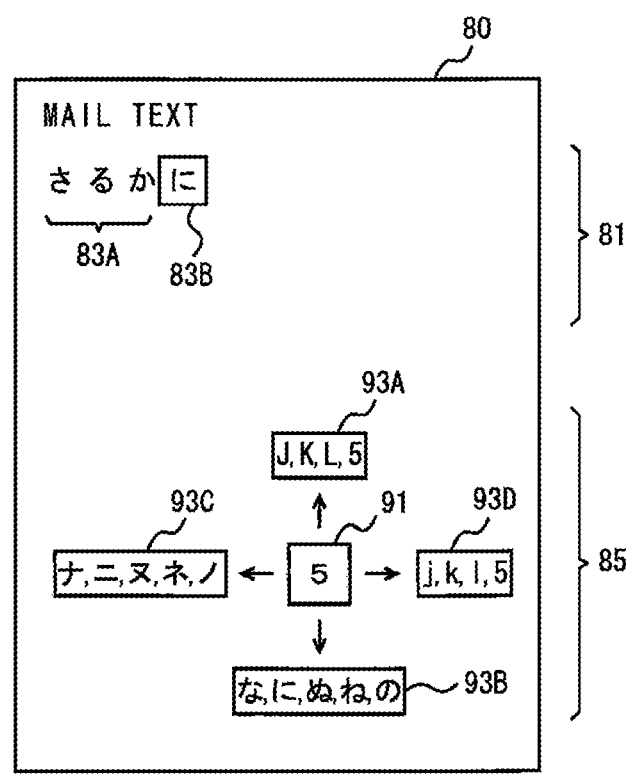
FIG. 6 is a diagram showing an example of a character input screen.

Display control portion 63 controls LCD 15 to display a character input screen on LCD 15. FIG. 6 is a diagram showing an example of a character input screen. Referring to FIG. 6, a character input screen 80 includes an input character displaying area 81 for displaying a character which is input, and a guidance displaying area 85. When receiving a group name from group selecting portion 57, display control portion 63 displays guidance on guidance displaying area 83. The guidance includes an area 91 on which a key corresponding to the first designated position is displayed, and areas 93A to 93D on which a plurality of selectable characters classified according to the moving directions are displayed.

The guidance shown here is displayed when a user designates the number "5" key and, hence, the position corresponding to the number "5" key is detected as a first designated position. The number "5" key is graphically displayed on area 91, and a plurality of characters included in each of the character types which will be selected when one of the upward, downward, leftward, and rightward moving directions is detected are displayed on its top, bottom, left, and right, respectively.

Here, area 93A arranged above area 91 displays a plurality of characters of "J, K, L, 5" which are of the "uppercase alphanumeric" character type selected when the designated position is moved upward. Area 93B arranged below area 91 displays a plurality of characters of "な, に, ぬ, ね, and の" which are of the "hiragana" character type selected when the designated position is moved downward. Area 93C arranged on the left of area 91 displays a plurality of characters of "ナ, ニ, ヌ, ネ, ノ" which are of the "katakana" character type selected when the designated position is moved leftward. Area 93D arranged on the right of area 91 displays a plurality of characters of "j, k, 1, 5" which are of the "lowercase alphanumeric" character type selected when the designated position is moved rightward.

Guidance displaying area 85 displays the guidance, which can notify a user of the plurality of characters that will be selected when a designated position is moved. This allows the user to determine in which one of the four directions the user needs to move his or her finger in order to select an intended character.

Input character displaying area 81 includes an area 83A displaying a character which is input, and a cursor area 83B. When a character is input from character selecting portion 61, display control portion 63 displays the input character in a selectable mode on cursor area 83B. When a plurality of characters are input before a cursor movement instruction is input from character selecting portion 61, the character being displayed on cursor area 83B is updated whenever a character is input. In other words, in the case where two or more characters are input before a cursor movement instruction is input, character selecting portion 61 displays on cursor area 83B only the character that has been input lastly, among the plurality of input characters.

When receiving the cursor movement instruction, display control portion 63 moves cursor area 83B by one character to the right, and enlarges input character displaying area 83A by one character. This causes the character that had been displayed in a selectable mode on cursor area 83B before the movement to be displayed on input character displaying area 83A. The position of cursor area 83B after the movement thereof is reserved as an area for displaying in a selectable mode a character which will be input later from character selecting portion 61.

Figure 7:
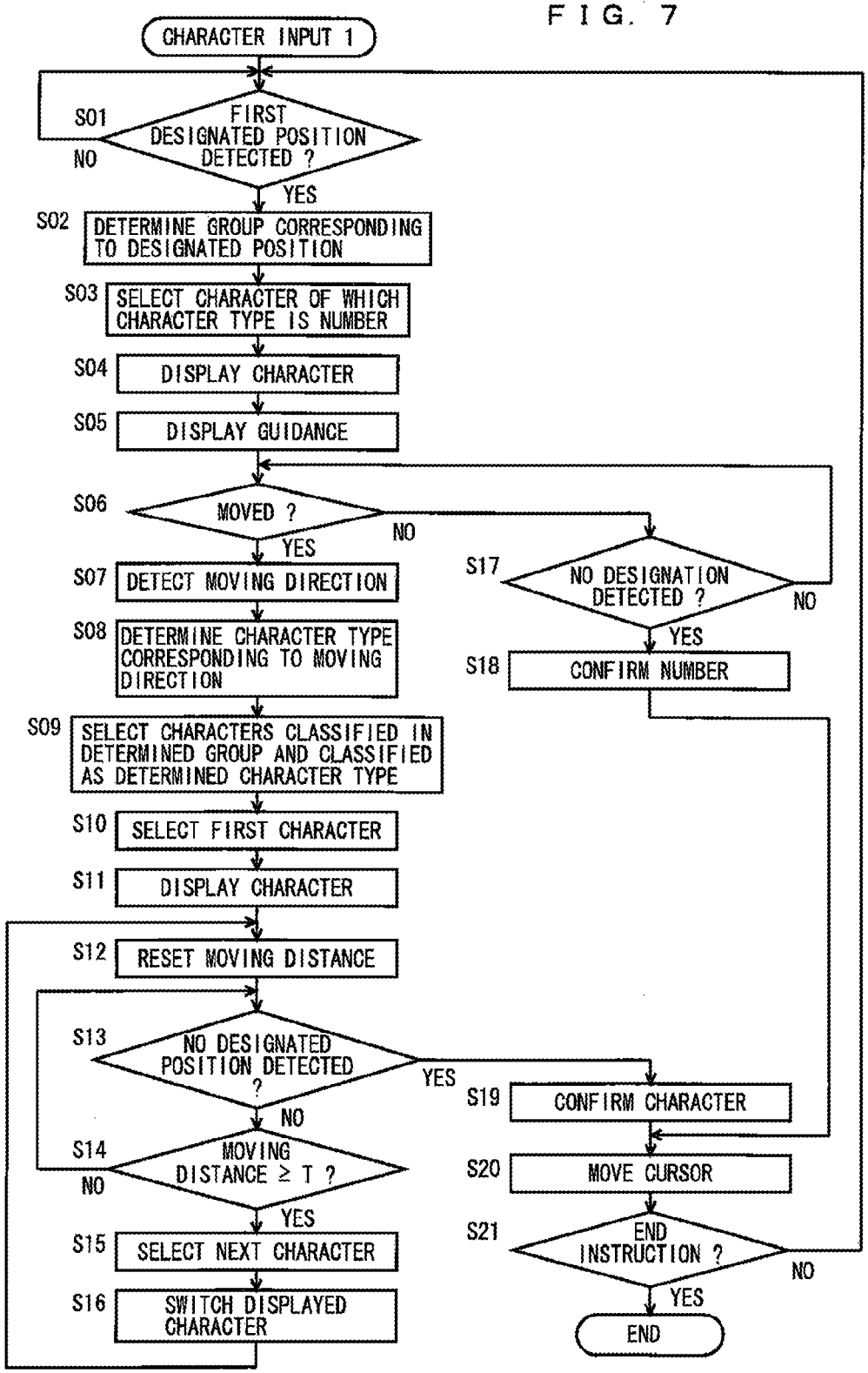
FIG. 7 is a flowchart illustrating an example of the flow of a character input process.

FIG. 7 is a flowchart illustrating an example of the flow of a character input process. The character input process is executed by control portion 21 as control portion 21 executes a program for inputting a character. Referring to FIG. 7, control portion 21 determines whether a first designated position has been acquired (step S01). While a user keeps touching key rubber 25A with his or her finger, touch sensor 27 detects the touched position as a designated position, and outputs the detected, designated position to control portion 21. Control portion 21 receives the designated position from touch sensor 27. When a designated position is input after no designated position has been input for a predetermined time or more, control portion 21 acquires the designated position as the first designated position. Control portion 21 is on standby until it acquires the first designated position, and once the first designated position is acquired, the process proceeds to step S02.

In step S02, a group corresponding to the first designated position is determined. Specifically, control portion 21 refers to the key position table to select one of the 12 keys that is associated with a position nearest to the first designated position. Control portion 21 then refers to the character table stored in EEPROM 33 to select one of the ten groups included in the character table that is associated with the selected key, and determines the selected group as a processing object.

Control portion 21 selects, from among a plurality of characters classified in the determined group, a character of which character type is "number" (step S03), and displays the selected character in a selectable mode (step S04).

Control portion 21 then displays guidance (step S05). The guidance displays graphically a key that is associated with a designated position nearest to the first designated position, and also displays by character type a plurality of characters that have been classified in the group determined in step S02 within the character table. Here, a plurality of characters of the "uppercase alphanumeric" character type are displayed above the graphically-displayed key, a plurality of characters of the "hiragana" character type are displayed below the graphically-displayed key, a plurality of characters of the "katakana" character type are displayed on the left side of the graphically-displayed key, and a plurality of characters of the "lowercase alphanumeric" character type are displayed on the right side of the graphically-displayed key. This allows the user to determine in which one of the four directions the user needs to move his or her finger in order to select an intended character type.

Next, it is determined whether the movement of the designated position has been detected (step S06). In the state where a designated position continues to be input from touch sensor 27 following the first designated position, it is determined whether a designated position that is different from the first designated position (i.e., the designated position for direction detection) has been input from touch sensor 27 or not. If the designated position for direction detection has been input, it is determined that the designated position has been moved, and the process proceeds to step S07; otherwise, the process proceeds to step S17.

In step S17, it is determined whether the designated position is no longer detected. If control portion 21 receives no designated position from touch sensor 27, the process proceeds to step S18; if control portion 21 continues to receive a designated position, the process returns to step S06. In step S18, the number that is being displayed in a selectable mode is confirmed as an input character, and the process proceeds to step S20. A user only needs to release his or her finger from key rubber 25A to confirm the character being input, ensuring easy operation.

In step S07, a moving direction is detected. The direction from the first designated position toward the designated position for direction detection is detected as the moving direction. Here, the moving direction to be detected is one of four directions of up, down, left, and right, the number of the directions being the same as the number of character types, or four. A character type that is predetermined corresponding to the detected moving direction is then determined (step S08). Here, the character type is determined to be "uppercase alphanumeric" when the moving direction is upward. The character type is determined to be "hiragana" when the moving direction is downward. The character type is determined to be "katakana" when the moving direction is leftward. The character type is determined to be "lowercase alphanumeric" when the moving direction is rightward.

Next, a character table stored in EEPROM 33 is referred to, to select a plurality of characters that have been classified in the group determined in step S02 and further classified as the character type determined in step S08 (step S09). For example, when the group is determined to be the one with the group name "G5" and subsequently the character type is determined to be "hiragana", then the five characters of "な", "に", "ぬ," "ね", and の" are selected. Then, from among the plurality of selected characters, a first character in a sequence is selected (step S10), and the selected character is displayed in a selectable mode (step S11). Then, the process proceeds to step S12.

In step S12, a moving distance is reset (step S12). It is then determined whether a designated position is no longer detected (step S13). If control portion 21 receives no designated position from touch sensor 27, the process proceeds to step S19. If control portion 21 continues to receive a designated position, the process proceeds to step S14. In step S14, it is determined whether the moving distance is equal to or greater than a threshold value T. If the moving distance is equal to or greater than the threshold value, the process proceeds to step S15; otherwise, the process returns to step S13. In other words, if a user moves his or her finger from an initially designated position by a distance of not smaller than the threshold value T with the finger kept in contact with key rubber 25A, the process proceeds to step S15; if the user releases his or her finger from key rubber 25A, the process proceeds to step S19.

In step S15, a next character in the sequence is selected. In the following step S16, the character that has been displayed in a selectable mode in step S11, or in step S16 which was executed previously, is replaced with the character selected in step S15, to switch the display. Thereafter, the process returns to step S12. This causes the display of a selectable character to be switched, enabling a user to confirm the character that the user is able to select from among a plurality of characters.

On the other hand, in step S19, the character that is being displayed in a selectable mode is confirmed as an input character, and the process proceeds to step S20. In step S20, a cursor is moved, and the process proceeds to step S21. In step S21, it is determined whether an end instruction has been received. The operation keypad is configured in advance to include a key corresponding to an instruction to terminate the character input process, and it is determined whether the key has been designated. If the end instruction is received, the process is terminated; otherwise, the process returns to step S01.

While the character input process shown in FIG. 7 detects a moving direction only one time when a designated position moves from the first designated position, the process may be configured, when the moving direction is changed afterwards, to select a character type corresponding to the changed moving direction. In this case, following the step S16 in which the character is displayed in a selectable mode, the process may return to step S07. In step S07, it may be determined whether a change in the moving direction has been detected. If a change in the moving direction is detected, the process may proceed to step S08; otherwise, the process may proceed to step S12. As such, when a change in the moving direction is detected, processes in steps S08 to S11 are executed, which allows a character type corresponding to the changed moving direction to be selected and one of the plurality of characters classified as that character type to be made selectable.

As described above, according to mobile phone 1 of the present embodiment, when a first designated position is detected, one often groups is selected, and when the movement of the designated position is detected, a character type corresponding to the moving direction is selected. Therefore, the group in which a character to be input is classified is selected using the position firstly designated with a finger and the direction in which the finger is moved. Furthermore, one character is selected in accordance with the distance by which the finger is moved or the time during which the position is designated, and when a user releases his or her finger from the key rubber, the character that has been selected is confirmed as an input character. As a result, one of a plurality of characters of a plurality of character types can be selected and input with simple operation.

<Modification>

While mobile phone 1 described above is configured to use touch sensor 27 to select a character which will be input, mobile phone 1 according to a modification is configured to select a character which will be input, further using an input of a key by key circuit board 25C. In the following, the differences from the above-described mobile phone 1 will be described primarily.

Figure 8:
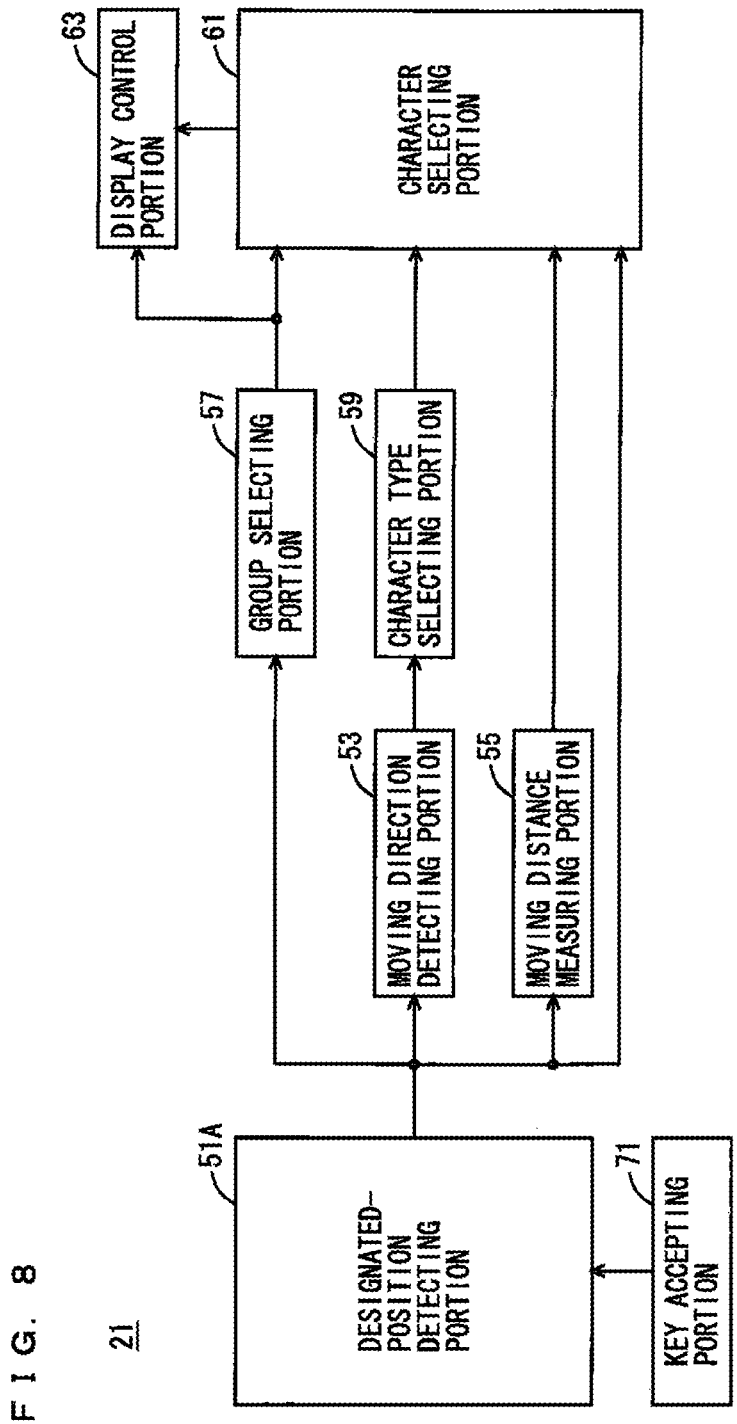
FIG. 8 is a functional block diagram showing, by way of example, the functions of the mobile phone according to a modification.

FIG. 8 is a functional block diagram showing, by way of example, the functions of the mobile phone according to a modification. Referring to FIG. 8, the functional block diagram of the modification is different from the functional block diagram shown in FIG. 4 in that a key accepting portion 71 has been added and the designated-position detecting portion, 51A, has been modified. The differences between the above-described mobile phone 1 and the modification will now be described mainly.

Key accepting portion 71 receives from key circuit board 25C a signal indicating which one of the 12 switch patterns arranged thereon has been shorted, and detects which one of the 12 keys arranged on key rubber 25A has been pressed down. In response to an input of the key from key circuit board 25C, key accepting portion 71 outputs a key signal indicating which one of the 12 keys has been pressed down, to designated-position detecting portion 51A.

Designated-position detecting portion 51A detects a designated position output from touch sensor 27, and outputs the designated position to group selecting portion 57, moving direction detecting portion 53, moving distance measuring portion 55, and character selecting portion 61. When a designated position which continued to be detected is no longer detected, designated-position detecting portion 51A outputs a determination signal to character selecting portion 61, and outputs a reset signal to group selecting portion 57, moving direction detecting portion 53, and moving distance measuring portion 55. Furthermore, when receiving a key signal from key accepting portion 71, designated-position detecting portion 51A outputs a reset signal to group selecting portion 57, moving direction detecting portion 53, and moving distance measuring portion 55, without outputting a determination signal to character selecting portion 61. Designated-position detecting portion 51A then detects the designated position output from touch sensor 27, and outputs the designated position to group selecting portion 57, moving direction detecting portion 53, moving distance measuring portion 55, and character selecting portion 61.

For example, in the case where a user is about to input the character "か", the user may designate another key incorrectly, for example the number "5" key. The case where the user falsely designated the key will now be described. In this case, after the user designated the number "5" key, the user may press down the number "2" key with his or her finger kept in contact with key rubber 25A. When the number "2" key is pressed down, designated-position detecting portion 51A outputs a reset signal to group selecting portion 57, moving direction detecting portion 53, and moving distance measuring portion 55, and then outputs a designated position corresponding to the number "2" key to group selecting portion 57, moving direction detecting portion 53, moving distance measuring portion 55, and character selecting portion 61.

Group selecting portion 57, when receiving the reset signal, cancels the group that has been selected till then, and outputs a cancel signal to character selecting portion 61. Thereafter, it receives the designated position corresponding to the number "2" key. The designated position corresponding to the number "2" key in this case is the first designated position, because it is the designated position firstly input after the reset signal is input. Therefore, group selecting portion 57 selects the group having the group name "G2", from among the ten groups included in the character table, on the basis of the designated position corresponding to the number "2" key, and outputs the group name of the selected group to character selecting portion 61.

Moving direction detecting portion 53, when receiving the reset signal from designated-position detecting portion 51, outputs a cancel signal to character type selecting portion 59. Thereafter, when the designated position corresponding to the number "2" key is input as the first designated position, moving direction detecting portion 53 waits until the designated position for direction detection which is different from the first designated position is input next from designated-position detecting portion 51. Moving direction detecting portion 53 detects as a moving direction the direction from the first designated position toward the designated position for direction detection, and outputs the detected moving direction to character type selecting portion 59.

When receiving the cancel signal from moving direction detecting portion 53, character type selecting portion 59 stops outputting to character selecting portion 61. Thereafter, when receiving the moving direction from moving direction detecting portion 53, character type selecting portion 59 selects one of the four character types included in the character table on the basis of the input moving direction, and outputs the selected character type to character selecting portion 61.

Moving distance measuring portion 55, when receiving the reset signal from designated-position detecting portion 51, resets the moving distance to "0". Thereafter, when the designated position corresponding to the number "2" key is input as the first designated position, moving distance measuring portion 55 uses the first designated position as a reference position to calculate, for every input of a designated position from designated-position detecting portion 51A, a moving distance from the first designated position toward the input designated position, and outputs the calculated moving distance to character selecting portion 61.

Before the cancel signal is input from group selecting portion 57, character selecting portion 61 has selected, from among the groups included in the character table stored in EEPROM 33, the group having the group name "G5" input from group selecting portion 57. When the cancel signal is input and subsequently the group name "G2" is input from group selecting portion 57, character selecting portion 61, selects, from among the groups included in the character table stored in EEPROM 33, the group having the group name "G2" that is input from group selecting portion 57, until a next cancel signal is input.

In this case, after the cancel signal is input from group selecting portion 57, at the point in time when the group name "G2" is input therefrom, character selecting portion 61 selects a character that is classified as the character type "number" in the group, and outputs the selected character to display control portion 63. Here, as the number "2" key has been pressed down, the number "2" is selected, and the character "2" is output to display control portion 63.

Thereafter, when a character type is input from character type selecting portion 59, character selecting portion 61 refers to the character table stored in EEPROM 33 to select a plurality of characters that have been classified in the group having the previously-input group name and further classified as the character type input. In this case, when "hiragana", for example, is input as the character type, five characters of "か", "き", "<", "け", and "こ" are selected.

Character selecting portion 61 then selects one of the selected characters, on the basis of the moving distance received from moving distance measuring portion 55, and outputs the selected character to display control portion 63. Thereafter, when the determination signal is input from designated-position detecting portion 51, character selecting portion 61 outputs a cursor movement instruction to display control portion 63.

Display control portion 63 controls LCD 15 to display a character input screen on LCD 15. When the cancel signal is input and subsequently the group name is input from group selecting portion 57, display control portion 63 displays guidance on guidance displaying area 85. Here, following the cancel signal, the group name "G2" is input, and thus, the number "2" key is graphically displayed, and a plurality of characters included in each of the character types which will be selected when one of the upward, downward, leftward, and rightward moving directions is detected are displayed on its top, bottom, left, and right, respectively. Here, a plurality of characters of "A, B, C, 2" which are of the "uppercase alphanumeric" character type selected when the designated position is moved upward are displayed above the graphical display of the number "2" key. A plurality of characters of "か", "き", "<", "け", "こ" which are of the "hiragana" character type selected when the designated position is moved downward are displayed below the graphical display of the number "2" key. A plurality of characters of "カ, キ, ク, ケ, コ" which are of the "katakana" character type selected when the designated position is moved to the left are displayed on the left of the graphical display of the number "2" key. A plurality of characters of "a, b, c, 2" which are of the "lowercase alphanumeric" character type selected when the designated position is moved to the right are displayed on the right of the graphical display of the number "2" key.

When a next character is input before the cursor movement instruction is input from character selecting portion 61, display control portion 63 displays the character on cursor area 83B. That is, when the number "5" key is firstly designated, the number "5" is displayed. Thereafter, while a user is moving his or her finger from the number "5" key to the number "2" key, the display on cursor area 83B is changed successively to "J", "K", "L", and "5". However, once the number "2" key is pressed down, the number "2" is displayed, accompanying no movement in cursor area 83B. Thereafter, when the user moves his or her finger upward, downward, leftward, or rightward, the displayed character is switched to a character of the character type corresponding to the designated direction.

Figure 9:
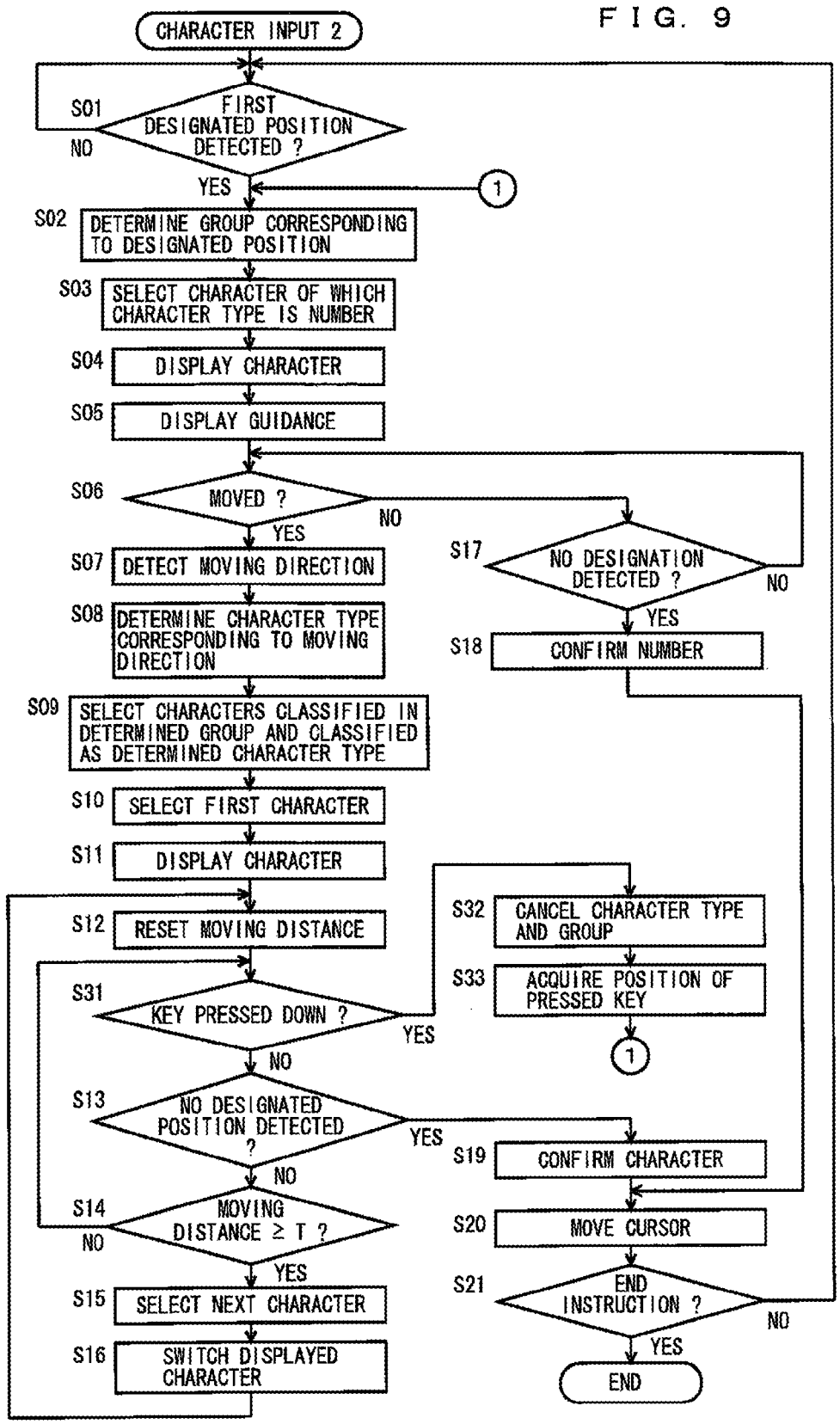
FIG. 9 is a flowchart illustrating an example of the flow of the character input process according to the modification.

FIG. 9 is a flowchart illustrating an example of the flow of the character input process according to the modification. Referring to FIG. 9, the flowchart in the modification is different from the flowchart shown in FIG. 7 in that steps S31 to S33 have been added. The other processes are identical to the processes shown in FIG. 7, and thus, description thereof will not be repeated here. Referring to FIG. 9, following the step S12 in which the moving distance is reset, in step S31, it is determined whether a key has been pressed down. If the key has been pressed down, the process proceeds to step S32; otherwise, the process proceeds to step S13. In step S32, the group determined in step S02 and the character type determined in step S08 are canceled. Then, in the following step S33, the designated position corresponding to the key pressed is acquired, and the process returns to step S02. When key circuit board 25C detects that one of the 12 keys has been pressed down, the designated position that is being detected by touch sensor 27 at that time is acquired, and the processes in step S02 and the subsequent steps are executed. As a result, even when an incorrect key is initially designated, a user can move his or her finger to a correct key with the finger kept in contact with key rubber 25A and press down the correct key, to change the designated key to the correct one. This enables easy correction of false selection of a character.

As described above, according to mobile phone 1 of the modification, a correct group can be readily selected even when another group has been falsely selected.

In the above embodiment, moving distance measuring portion 55 measures a moving distance of the designated position. Instead thereof, a designation time measuring portion may be provided which measures, after a moving direction is detected by moving direction detecting portion 53, a duration in which a designated position is designated. In this case, the designation time measuring portion outputs the measured time to character selecting portion 61. When receiving a reset signal from designated-position detecting portion 51, the designation time measuring portion resets the measured time to "0".

Character selecting portion 61 selects one of the selected characters on the basis of the designating time input from the designation time measuring portion, and outputs the selected character to display control portion 63. Character selecting portion 61 sequences the selected characters in advance. Character selecting portion 61 then selects a first character in the specified sequence when the designating time is zero. Character selecting portion 61 selects a next character in the specified sequence whenever the designating time increases by a predetermined time. When the designating time increases by the predetermined time after the last character in the specified sequence has been selected, the first character is selected because the characters have all been displayed. For example, at the point in time when a character type is selected, character selecting portion 61 initially selects a first character in a predetermined sequence. While the sequence may be arbitrarily determined in advance, it is here assumed that characters are selected in Japanese alphabetical order, alphabetical order, and ascending order of numbers. The character to be selected first may be determined on the basis of the history in which characters were selected in the past.

While the mobile phone has been described as an example of the character input device in the above embodiment, the present invention may of course be understood as a method for inputting a character, for executing the processes shown in FIG. 7 or FIG. 9, or a program for inputting a character, for causing a computer to execute the method for inputting a character.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

APPENDIX (1) The character input device according to claim 1, further comprising key input accepting portion to accept input of a predetermined key, wherein said second selecting portion reverses the order of selecting the one of the at least one character classified in said selecting group when said key input accepting portion accepts the input of said predetermined key.

(2) The character input device according to claim 1, wherein when the moving direction detected by said direction detecting portion is changed, said second selecting portion reverses the order of selecting the one of the at least one character classified in said selecting group.

(3) The character input device according to claim 1, wherein when the moving direction detected by said direction detecting portion is changed, said first selecting portion selects one of said plurality of groups as the selecting group on the basis of the changed moving direction.

(4) The character input device according to claim 5, further comprising displaying portion to display a plurality of characters classified in said first selecting group by said plurality of second type groups in response to the event that said position detecting portion detects the position.

(5) The character input device according to (4), wherein said displaying portion displays the plurality of characters classified in said first selecting group by said plurality of second type groups, by arranging the characters belonging to respective ones of said plurality of second type groups in directions predetermined respectively for said plurality of second type groups.

(6) A method for inputting a character, comprising the steps of:

detecting a designated position;

detecting a moving direction of the detected position;

selecting, on the basis of the position detected at a predetermined time, one group as a first selecting group from among a plurality of first type groups into which a plurality of characters have been classified;

when said moving direction is detected, selecting, on the basis of the moving direction, one group as a second selecting group from among a plurality of second type groups into which said plurality of characters have been classified; and selecting one of at least one character, among said plurality of characters, that has been classified in both said first selecting group and said second selecting group.

(7) A program for inputting a character, causing a computer to perform the steps of:

detecting a designated position;

detecting a moving direction of the detected position;

selecting, on the basis of the position detected at a predetermined time, one group as a first selecting group from among a plurality of first type groups into which a plurality of characters have been classified;

when said moving direction is detected, selecting, on the basis of the moving direction, one group as a second selecting group from among a plurality of second type groups into which said plurality of characters have been classified; and selecting one of at least one character, among said plurality of characters, that has been classified in both said first selecting group and said second selecting group.

The invention claimed is:

1. A character input device, comprising at least one controller that executes a program to:
  detect a position of a touch operation in an area in which a plurality of numbers are indicated;
  identify one of the plurality of numbers which is associated in advance with the detected position;
  display said identified number and first and second related characters of said identified number, in a manner that said first and second related characters are positioned around said identified number, wherein said first related character is positioned in a first direction from said identified number, wherein said second related character is positioned in a second direction from said identified number, and wherein the first direction is substantially orthogonal to the second direction; and
  make selectable said second related character, when the touch operation moves in the first direction from the identified number and then subsequently and directly changes from moving in the first direction to moving in the second direction.

2. A method for inputting a character, the method comprising:
  detecting a position of a touch operation in an area in which a plurality of numbers are indicated;
  identifying one of the plurality of numbers which is associated in advance with the detected position;
  displaying the identified number and first and second related characters of said identified number, in a manner that said first and second related characters are positioned around said identified number, wherein said first related character is positioned in a first direction from said identified number, and wherein said second related character is positioned in a second direction from said identified number; and
  making selectable said second related character, when the touch operation moves in the first direction from the identified number and then subsequently and directly changes from moving in the first direction to moving in the second direction.

3. The character input device according to claim 1, wherein first and second numbers of the plurality of numbers are associated with first and second positions, respectively, in the area in which the plurality of numbers are indicated, and wherein said at least one controller identifies not the second number but the first number, when the first position is firstly detected, and then the position of the touch operation moves from the first position to the second position.

4. A character input device comprising at least one controller that executes a program to:
  detect a position of a touch operation in an area in which a plurality of characters are indicated;
  identify one of the plurality of characters which is associated in advance with the detected position;
  display said identified character and first and second related characters of said identified character, in a manner that said first and second related characters are positioned around said identified character, said first related character is positioned in a first direction from said identified character, and said second related character is positioned in a second direction from said identified character, wherein the first direction is substantially orthogonal to the second direction; and
  make selectable said second related character, when the touch operation moves in the first direction from the identified character and then subsequently and directly changes from moving in the first direction to moving in the second direction.

* * * * *